(12) United States Patent
Masimore

(10) Patent No.: US 11,553,250 B2
(45) Date of Patent: Jan. 10, 2023

(54) UPDATING APPLICATION CODE

(75) Inventor: Tony R. Masimore, Newportville, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 12/202,673

(22) Filed: Sep. 2, 2008

(65) Prior Publication Data

US 2010/0058425 A1    Mar. 4, 2010

(51) Int. Cl.
*H04N 21/458*   (2011.01)
*H04N 21/435*   (2011.01)
*H04N 21/235*   (2011.01)
*H04N 21/443*   (2011.01)
*G06F 8/656*    (2018.01)

(52) U.S. Cl.
CPC ......... *H04N 21/4586* (2013.01); *G06F 8/656* (2018.02); *H04N 21/235* (2013.01); *H04N 21/435* (2013.01); *H04N 21/443* (2013.01)

(58) Field of Classification Search
CPC ............ H04N 21/4586; H04N 21/235; H04N 21/435; H04N 21/443
USPC .......... 725/50, 139, 140, 151, 152; 709/221; 717/168–173
See application file for complete search history.

(56) References Cited

U.S. PATENT DOCUMENTS

| | | | |
|---|---|---|---|
| 6,442,755 B1 * | 8/2002 | Lemmons et al. | 725/47 |
| 8,005,931 B2 * | 8/2011 | Naoi | G06F 8/38 |
| | | | 709/222 |
| 8,635,590 B1 * | 1/2014 | Ogilvie | G06F 9/44521 |
| | | | 717/110 |
| 2002/0120724 A1 * | 8/2002 | Kaiser et al. | 709/221 |
| 2003/0093790 A1 * | 5/2003 | Logan et al. | 725/38 |
| 2003/0217186 A1 * | 11/2003 | Bushey | 709/250 |
| 2003/0219081 A1 | 11/2003 | Sheehan et al. | |
| 2004/0064682 A1 * | 4/2004 | Nguyen | G06F 9/30072 |
| | | | 712/226 |
| 2004/0123187 A1 * | 6/2004 | Colyer | G06F 11/366 |
| | | | 714/38.1 |
| 2004/0226049 A1 * | 11/2004 | Shiomi | 725/131 |
| 2006/0136898 A1 * | 6/2006 | Bosscha et al. | 717/168 |
| 2006/0190966 A1 * | 8/2006 | McKissick | G06Q 30/02 |
| | | | 725/61 |
| 2007/0015480 A1 * | 1/2007 | Mason | 455/186.1 |
| 2007/0204293 A1 * | 8/2007 | Hamada | H04N 5/4401 |
| | | | 725/37 |
| 2008/0040767 A1 | 2/2008 | McCarthy et al. | |

FOREIGN PATENT DOCUMENTS

WO    WO-2007132677 A1 * 11/2007 ............... G06F 8/38

OTHER PUBLICATIONS

International Search Report dated Oct. 22, 2009 for PCT/US 09/55711.

* cited by examiner

Primary Examiner — Joshua D Taylor

(74) Attorney, Agent, or Firm — Banner & Witcoff, Ltd.

(57) ABSTRACT

A system and method for updating a settop box (STB) architecture that can be used to immediately update a device without requiring the device to be reset/restarted. The device may be any type of device that simultaneously supports multiple applications. The architecture may be used to update one of the applications with new functionality in a seamless manner that allows the applications including the one application to continue to operate without interruption.

5 Claims, 3 Drawing Sheets

UPDATING APPLICATION CODE

BACKGROUND OF THE INVENTION

1. Field of the Invention

The present invention relates to systems and methods for updating devices coupled to a telecommunications network, such as, but not limited to, set top boxes (STBs) and other devices used to provide services to subscribers. The systems and methods allow the devices to be updated without disrupting services and applications being provided to the subscribers.

2. Background Art

When new functionality, fixes to old functionality, or removal of temporary functionality, all considered functionality updates, are performed on an STB, functionality is directly modified. Currently, upon completion of the functionality modification, a reset command is required to update the STB and implement the new functionality and continue STB service to the customer. This reset causes an interruption in service and, as such, careful consideration is necessary when planning and executing functionality updates to the STB.

SUMMARY OF THE INVENTION

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
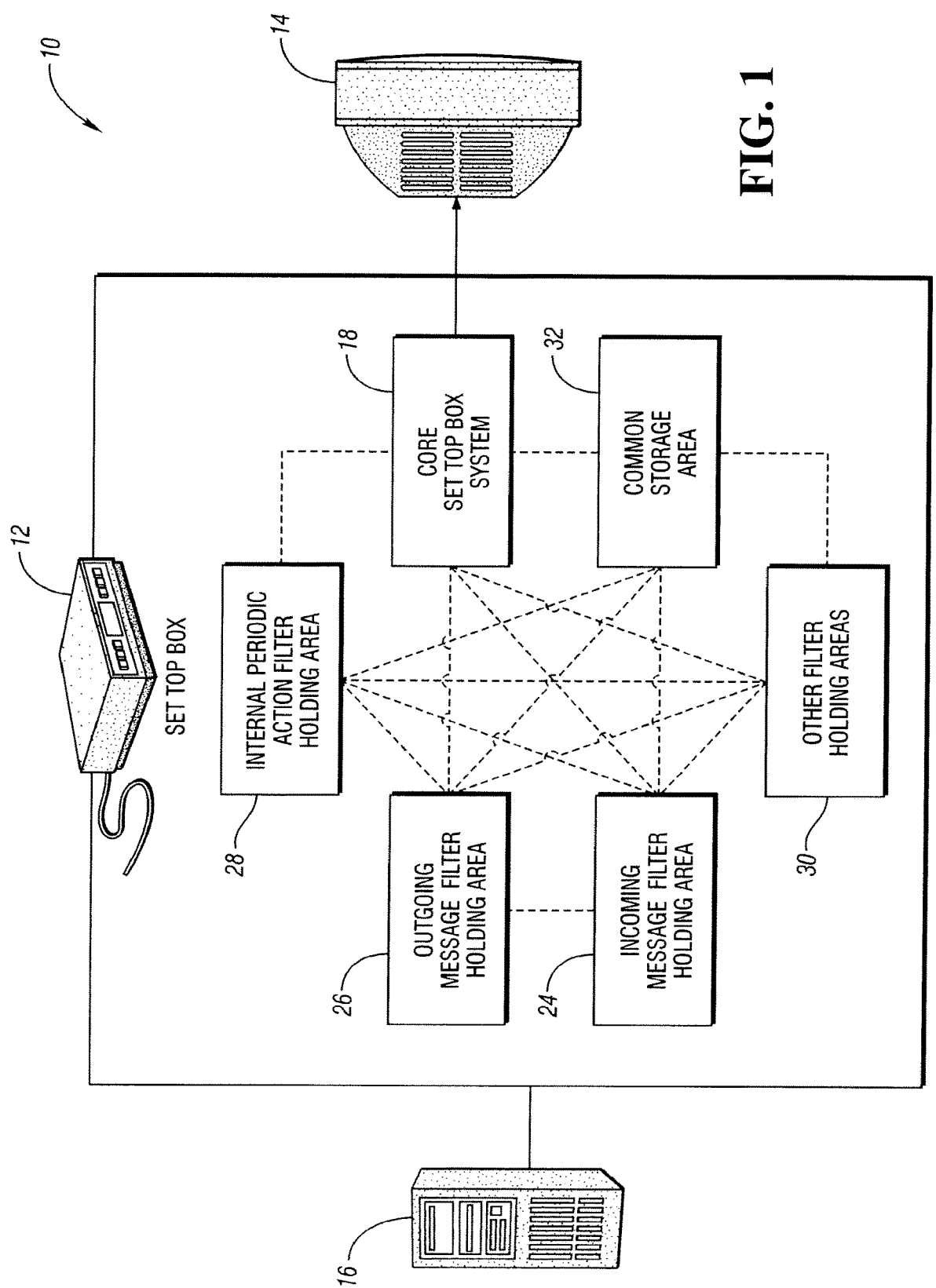
FIG. 1 illustrates an architecture configured to facilitate updating a device such as an STB in accordance with one non-limiting aspect of the present invention.

FIG. 1 illustrates a system 10 configured to facilitate updating a device in accordance with one non-limiting aspect of the present invention. The system 10 is predominately described with respect to updating in a settop box (STB) 12 that manipulates signals for output to a viewing device 14, e.g., a television. The STB 12 may be of the type that supports television related services. This exemplary description is not intended to limit the scope and contemplation of the present invention. The present invention fully contemplates its use and application in other environments and with other devices.

The STB 12 may operate as instructed by code, firmware, and applications, generally referred to as instructions suitable to controlling operations of the STB 12. The instructions may be periodically updated to support new services, fix old functionality, support temporary functionality, and/or perform any number of other maintenance or update operations.

A controller 16 or data carousel is included to facilitate periodically updating the STB 12. The present invention contemplates any type of updating of the STB 12. The present invention is, for exemplary purposes and without intending to limit the scope and contemplation of the present invention, described with respect to updating STB code. The STB code updates may include, but are not limited to, replacing old code with new code, adding new code to support operations that rely on old code (patches), and/or adding new code to support new operations.

One non-limiting aspect of the present invention contemplates updating the STB 12 in a seamless manner. The seamless updating may include supporting operations on the STB 12 that require new code while at the same time supporting the operations of established functionality without interrupting or otherwise disrupting usage of the STB 12. This may include allowing the new code to operate while a user is viewing the television and without the user noticing any undesirable disruption in service and/or allowing the new code to operate without recompiling or performing other operations that require the STB 12 to be re-started or turned off and on.

One example of the seamless updating contemplated by the present invention relates to a scenario where a first application, such as firmware, is already running on the STB 12 and new functionality is available for a second application, an electronic programming guide (EPG), that is about to begin, which may be provided to the STB 12 by the STB controller 16. The second application may begin operating according to the new functionality without interrupting the currently running, first application. One example of this type of updating may occur when the first application on the STB 12 is processing signals for output to a television while a user instigates the second application for which an update is available. Without exiting or restarting the application, the second application can begin running according to the update. This type of update can allow other applications to run seamlessly while another application is started according to new functionality.

Another example of the seamless updating contemplated by the present invention involves a scenario where an application is already running when new functionality becomes available. The new functionality may be implemented seamlessly or immediately, i.e., without shutting down, restarting, or otherwise disrupting operations of the application. One example of this type of updating may occur when a guide application is running and additional functionality for the guide application becomes available. Rather than requiring the guide application to restart, the new guide functionality can begin running at an appropriate period of time, which may arise when new actions are implemented, messages received, etc. The new functionality, or more particularly the data and other instructions associated therewith, are, for example, non-compiling code or other code that can begin running without restart of the guide application. This may optionally include temporarily running the new functionality as a separate application until a later time when the new functionality can be integrated with the previously established guide application after the previously established guide application is shutdown and restarted.

The STB 12 may include a core STB system 18. The core STB system 18 generally refers to a portion of the STB 12 having instructions, code, or other features that support established STB functionality, i.e., functionality that is already is use. An architecture contemplated by one non-limiting aspect of the preset invention to facilitate seamlessly updating the STB 12 may include providing/loading the STB 12 with a number of "filters". The filters may be loaded within one or more filter holding areas, which may include an incoming message filter holding area 24, an outgoing message filter holding area 26, an internal periodic filter action holding area 28, and an other filter holding area 30.

The filters are self-contained sets of code that control the STB 12 to perform desired actions. The controller 16 transmits the filters stored in each holding area 24, 26, 28, and 30 to the STB 12. The filters may include instructions, code, or other information that is suitable to controlling operations of the STB 12. The filters may operate with the core STB system 18 and information stored in a common storage area 32 to support updating STB functionality. The common storage area 32 generally refers to a memory area or other database where code and other information can be stored on the STB 12 and retrieved for usage.

Figure 2:
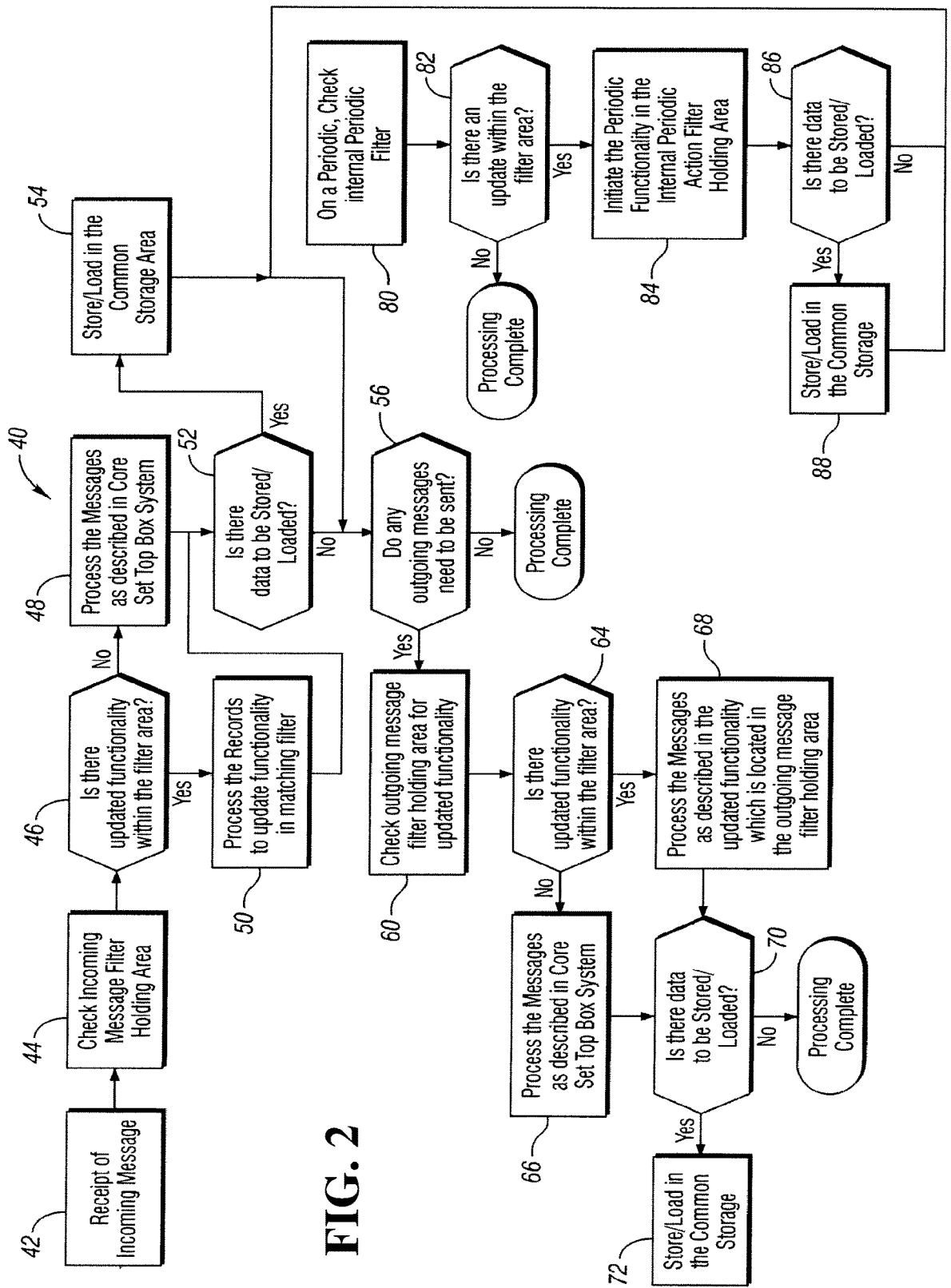
FIG. 2 illustrates a flowchart of a method for facilitating device updates such as STB updates in accordance with one non-limiting aspect of the present invention.

FIG. 2 illustrates a flowchart 40 of a method for facilitating STB updates in accordance with one non-limiting aspect of the present invention. The method relates to updating code of the STB 12 in a seamless manner. The method is described for exemplary purposes with respect to updating the STB 12 and initiating the update as a function of incoming messages, internal timers, and/or other internal events. The present invention contemplates other processes and triggers and is not intended to be limited to those described below.

Block 42 relates to the STB 12 receiving an incoming message. The incoming message includes any message communicated from the STB controller 16 or other device in communication with the STB 12. The incoming message includes messages commonly received during operation, messages directed towards prompting the STB 12 to update, and/or any other type of message. Once the incoming message is received at the STB 12, the incoming message filter holding area 24 is checked for any information relevant to the incoming message (Blocks 44, 46).

If no filter is found to correspond with the incoming message, then Block 48 is reached and the incoming message is processed according to instructions stored in the core STB system 12. The core STB system 12 processes the incoming message as normal and according to the instructions specified in the core STB system 12.

If the incoming message was associated with an update to the related core STB system 18 or intended to trigger some other change to the normal process, then Block 50 matches the incoming message to a corresponding incoming message filter and the STB 12 begins executing the operations/ updating functionality specified in the corresponding/ matched filter and not according to the established functionality of the core STB system 18. This may include performing any number of operations according to instructions and other parameters specified in the incoming message filter, such as, but not limited to, retrieving data, data calculations, external message generation, etc.

Block 52 assesses whether the processing instructed by the incoming message filter requires loading or storing data or code to the common storage area 32. Data may need to be written to the common storage area 32 for any number of reasons. Some applications generate data and other information that is used by other applications. This type of information may be written to the common storage area 32. Information stored in the common storage area 32 may be commonly available to the filters and the core STB system 18 and used with their respective processes. Block 54 relates to storing the data to the common storage area 32.

Block 56 is reached once any data loading is complete and relates to assessing whether any outgoing messages need to be sent. Depending on the operation being updated, an outgoing message may need to be communicated from the STB 12. These outgoing messages may be sent throughout the update process or upon its completion. The update process is completed if no outgoing messages are to be sent and continued at Block 60 if outgoing messages are to be sent.

Block 64 relates to assessing whether an outgoing message filter holding area 26 includes any information relevant to the outgoing message. The outgoing message holding area 26 may be populated with any number of filters to facilitate processing any type of outgoing message. The filters may be loaded by the STB controller 16 in advance of the outgoing message or upon completion of one of the steps described above. The filters may instruct the STB 12 to perform any number of operations, such as, but not limited to, transmitting messages associated with supporting two-way communications, unsolicited communications, and command and control.

If the outgoing message was not associated with a filter stored in the outgoing message filters holding area 26, then Block 66 is reached and the STB 12 sends the outgoing message according to instructions provided in the core STB system 18. If the outgoing message was associated with a filter, Block 68 is reached and the outgoing message is sent according to instructions specified in the filter. Once the update is completed, Block 70 is reached and the need to store or load data into the common storage area 32 is assessed. Any data that is to be loaded is loaded in Block 72.

The foregoing process instigates an update to the core STB system 18 processing upon receipt of an incoming message, and optionally once the process beginning, upon determining a need to send an outgoing message. Rather than solely relying on the incoming message to trigger an update, Block 80 relates to triggering an update according to an internal operation of the STB 12. The STB may monitor any number of internal processes to assess whether an update is needed.

Block 82 relates to assessing whether there is a corresponding filter stored in an internal periodic action filter holding area 28. If no filter is available, then the trigger is processed according to instructions included with the core STB system 18. If a filter is available, then the trigger is processed in Block 84 according to instructions included within the internal periodic action filter holding area 28. Once the processes are completed, any loading of data to the common storage area 32 is completed in Blocks 86, 88.

Figure 3:
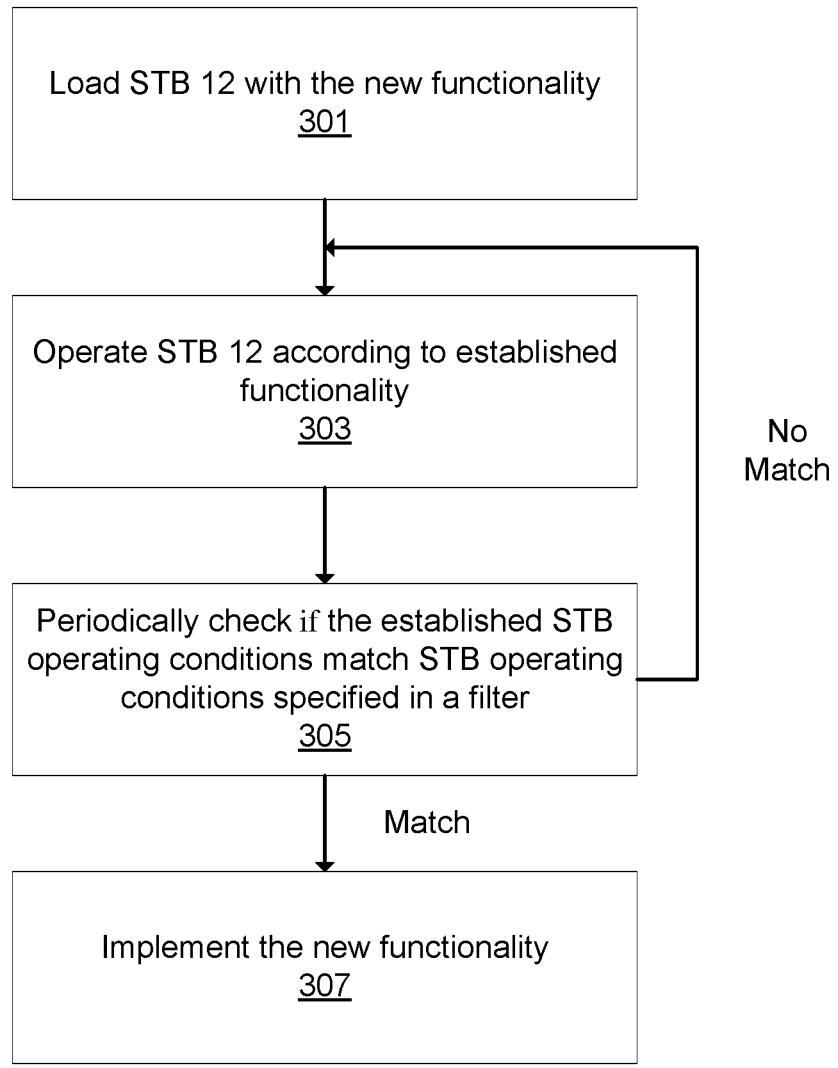
FIG. 3 illustrates an example method for updating functionality of a device and eliminating established functionality in accordance with one or more non-limiting aspects of the present application.

FIG. 3 illustrates an example method for updating functionality of a device, such as STB 12, and eliminating established functionality in accordance with one or more non-limiting aspects of the present application. As supported above, one non-limiting aspect of the present invention contemplates an architecture/process for use with a STB 12 that allows the STB 12 to operate according to its currently programmed, established functionality. When a fix, update, addition or other new functionality is desired, the STB 12 is, at step 301, loaded with the new functionality and yet, as represented by steps 303 and 305, continues to operate according to the current, established functionality until an appropriate trigger or event occurs to indicate an opportunity to seamlessly or immediately start operating according to the new functionality.

One non-limiting aspect of the present invention contemplates the seamless update being facilitated with the use of non-compiling code or other suitable programming that allows the STB 12 to execute the new functionality without having to be re-started or powered on and off. Instead, the non-compiling code can be stored in the common storage area 32 and/or with one of the filters so that it can be begin executing upon occurrence of certain operating parameters, events, internal/external prompts, etc., that match with parameters defined within one or more of the filters.

One non-limiting aspect of the present invention contemplates supporting new functionality without having to restart or otherwise disrupt operation of the STB 12, i.e., it can eliminate the need to immediately restart the STB 12 after loading the new code. It can also allow the present invention to, as represented below at steps 305 and 307, dictate any number of operating conditions that must be met before instigating the new functionality and eliminating established functionality, which can provide greater flexibility in supporting updates, especially temporary updates that may be only be used for a short period of time. This may include, for example, at step 303, operating the STB according to established functionality and, at step 305, periodically checking if the established STB operating conditions match STB operating conditions specified in a filter. If the specified operating conditions match the current STB operating conditions, then, at step 307, the new functionality may be immediately implemented.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
   executing, by a computing device, code for established functionality of an application of the computing device;
   receiving temporary application code configured to cause elimination of the established functionality of the application;
   determining one or more operating conditions to eliminate the established functionality;
   executing the temporary application code to cause the elimination of the established functionality of the application; and
   causing, based on a determination that the one or more operating conditions are satisfied, elimination, from storage of the computing device, of the code for the established functionality.

2. The method of claim 1, wherein executing the temporary application code is performed based on the computing device receiving an incoming message, and wherein the temporary application code, when executed, causes the computing device to process the incoming message.

3. The method of claim 2, wherein the application comprises a content listing application.

4. The method of claim 1, wherein the temporary application code comprises non-compiling code.

5. The method of claim 1, wherein executing the temporary application code comprises executing the temporary application code without requiring a restart of the application.

* * * * *

UNITED STATES PATENT AND TRADEMARK OFFICE
CERTIFICATE OF CORRECTION

PATENT NO. : 11,553,250 B2
APPLICATION NO. : 12/202673
DATED : January 10, 2023
INVENTOR(S) : Masimore It is certified that error appears in the above-identified patent and that said Letters Patent is hereby corrected as shown below:

In the Specification

Column 3, Detailed Description of The Preferred Embodiment(S), Line 5:
Delete "filter action" and insert --action filter-- therefor Column 4, Detailed Description of The Preferred Embodiment(S), Line 12:
After "message", insert --filter-- therefor Signed and Sealed this
Eighteenth Day of June, 2024

Katherine Kelly Vidal
*Director of the United States Patent and Trademark Office*